(12) United States Patent
Brandner et al.

(10) Patent No.: US 7,565,986 B2
(45) Date of Patent: Jul. 28, 2009

(54) FUEL SYSTEM COMPONENT AND METHOD OF MANUFACTURE

(75) Inventors: Brian W. Brandner, Kingsville (CA); Vladimir Franjo, Windsor (CA); Keith D. Kersey, Windsor (CA); Harald Knueppel, Belle River (CA)

(73) Assignee: TI Group Automotive Systems, L.L.C., Warren, MI (US)

( * ) Notice: Subject to any disclaimer, the term of this patent is extended or adjusted under 35 U.S.C. 154(b) by 312 days.

(21) Appl. No.: 10/726,182

(22) Filed: Dec. 2, 2003

(65) Prior Publication Data

US 2005/0115973 A1    Jun. 2, 2005

(51) Int. Cl.
*B62D 33/00* (2006.01)
*B60P 3/00* (2006.01)
*B65D 1/40* (2006.01)

(52) U.S. Cl. .................. 220/563; 220/562; 220/62.11
(58) Field of Classification Search ............... 220/86.1, 220/86.2, 86.3, 700, 697, 570, 570.1, 733
See application file for complete search history.

(56) References Cited

U.S. PATENT DOCUMENTS

| | | | |
|---|---|---|---|
| 5,202,078 A | 4/1993 | Moore | |
| 5,951,059 A * | 9/1999 | Kitamura | ............... 285/24 |
| 6,177,162 B1 | 1/2001 | Siour et al. | |
| 6,305,568 B1 * | 10/2001 | Suzuki et al. | ........... 220/562 |
| 6,467,643 B1 * | 10/2002 | Sadr | ................... 220/562 |
| 6,702,974 B2 | 3/2004 | Brandner | |
| 6,811,739 B2 | 11/2004 | Sadr | |
| 6,843,267 B1 * | 1/2005 | Van Schaftingen et al. | ... 137/202 |
| 6,860,398 B2 * | 3/2005 | Potter et al. | .............. 220/567.2 |
| 6,915,812 B2 * | 7/2005 | Frohwein | ................... 137/202 |
| 2002/0011490 A1 * | 1/2002 | Nakamura et al. | ........ 220/4.12 |
| 2002/0063129 A1 * | 5/2002 | Potter et al. | ............... 220/4.13 |
| 2003/0124281 A1 * | 7/2003 | Ries et al. | ................. 428/35.7 |
| 2004/0074904 A1 * | 4/2004 | Share et al. | .............. 220/62.22 |
| 2004/0124567 A1 * | 7/2004 | Stangier | .................... 264/523 |
| 2005/0067415 A1 * | 3/2005 | Gerard et al. | ............ 220/62.11 |
| 2005/0211298 A1 * | 9/2005 | Frohwein | .................... 137/202 |

FOREIGN PATENT DOCUMENTS

| | | |
|---|---|---|
| JP | 63-242723 | 10/1988 |
| JP | 63242723 A | 10/1988 |

* cited by examiner

*Primary Examiner*—Anthony D Stashick
*Assistant Examiner*—Shawn M Braden
(74) *Attorney, Agent, or Firm*—Reising Ethington P.C.

(57) ABSTRACT

A fuel tank that is substantially impermeable to fuel vapor has a shell with an interior for holding fuel, an opening for receiving fuel into the interior, and a fill nipple with a barrier layer. The fill nipple has an outer surface and an inner surface defining a passage extending between a pair of generally opposed ends of the fill nipple. One of the ends is attached to the shell such that the passage is aligned with the opening to allow fuel to flow through the passage and into the interior of the fuel tank. The fill nipple has an inner layer of material forming the inner surface, and an outer layer of material forming the outer surface, and has at least one intermediate layer of material forming the barrier layer. The intermediate layer is formed from a material that is different in composition from the inner and outer layers.

10 Claims, 1 Drawing Sheet

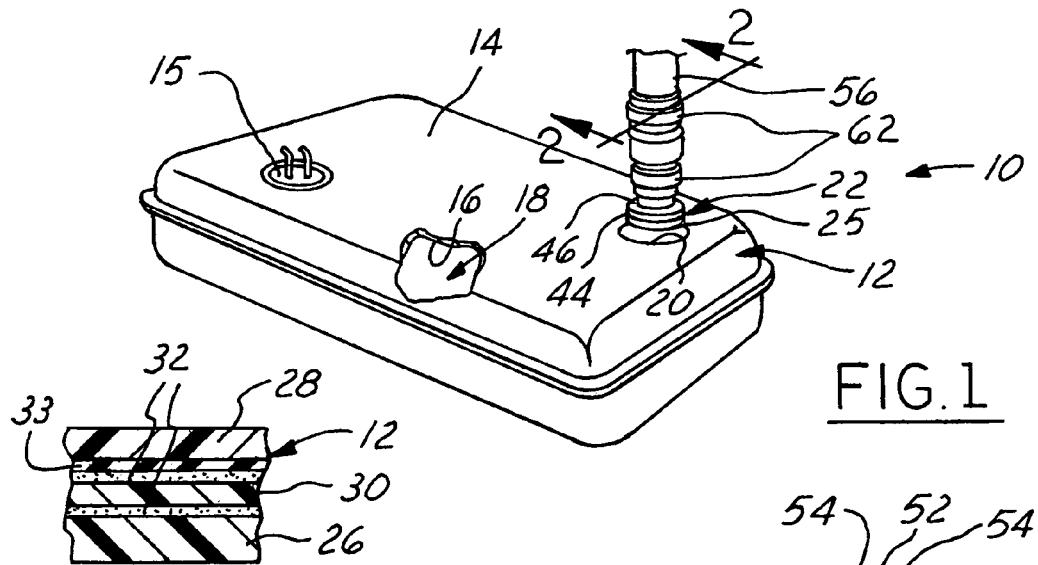
FIG. 1
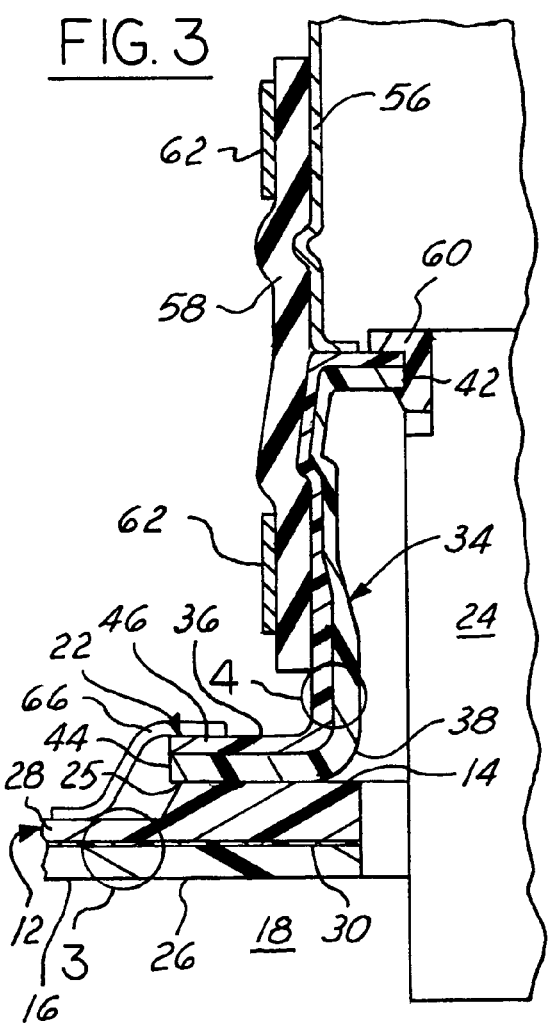
FIG. 3
FIG. 2
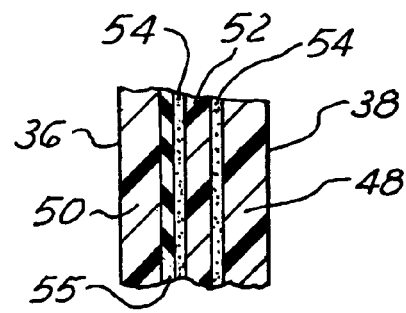
FIG. 4
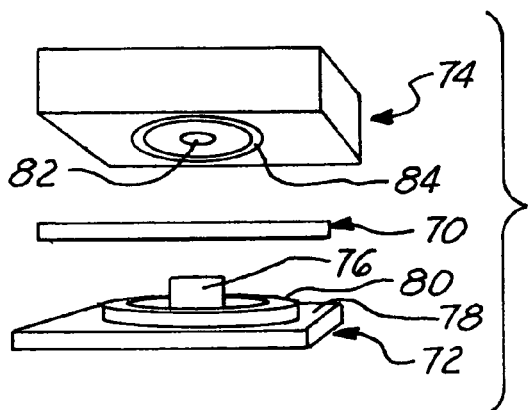
FIG. 5

FUEL SYSTEM COMPONENT AND METHOD OF MANUFACTURE

FIELD OF THE INVENTION

This invention relates generally to fuel systems, and more particularly to a fuel system component and a method of making it.

BACKGROUND OF THE INVENTION

It is known to blow mold fuel tanks from co-extruded six layer parisons that include inner and outer layers of HDPE, a vapor barrier layer sandwiched between a pair of adhesive layers, and a layer of regrind material between one of the adhesive layers and the outer layer. Wherever the vapor barrier layer is interrupted there is a potential path through which hydrocarbons can more easily escape to the atmosphere from the fuel tank. The vapor barrier layer may be interrupted in, for example, the area of openings through the fuel tank wall and in the area of the pinch or seam formed when the parison is closed for molding.

One opening in the fuel tank is provided to receive fuel into the fuel tank through a fill pipe that is attached to the tank via a fill nipple at one end, and receives a refueling nozzle of a refueling or gas station pump at its other end. Conventional fill nipples where made of monolayer HDPE that easily bonded to the fuel tank, but were not highly effective at reducing or inhibiting hydrocarbon permeation to the atmosphere.

In order to meet increasingly strict emission standards, largely promulgated by governmental agencies, it is desirable to form fuel tank and system components that contact liquid fuel or fuel vapor to limit fuel vapor emissions to the atmosphere.

SUMMARY OF THE INVENTION

A fuel tank that is substantially impermeable to fuel vapor has a shell with an interior for holding fuel, an opening for receiving fuel into the interior, and a fill nipple in communication with the opening and having a fuel vapor barrier layer. The fill nipple defines a passage and is attached to the shell so that the passage is aligned with the opening to allow fuel to flow through the fill nipple and into the interior of the fuel tank. The fill nipple has an inner layer of material forming the inner surface, and an outer layer of material forming the outer surface, and has at least one intermediate layer of material forming the barrier layer. The intermediate layer is formed from a material that is different in composition from the inner and outer layers and preferably resists permeation of hydrocarbons therethrough.

In one presently preferred embodiment, the fill nipple has six layers including the inner and outer layers, a vapor barrier layer disposed between two adhesive layers, and a layer of regrind material between the outer layer and one of the adhesive layers. The fill nipple is preferably thermoformed by various methods, including at least vacuum, blow or compression molding or extruded multi-layer sheets or parisons.

Some objects, features and advantages of the present invention include providing a construction for fuel tanks having a fill nipple with a substantially vapor impermeable passage between the fuel tank and a fill pipe, providing a fill nipple that can be readily attached to the shell of the fuel tank, providing a fill nipple that resists delamination, providing a high strength joint between the fill nipple and the shell of the fuel tank, providing a relatively easy and economical manufacture for the construction of the fill nipple, and providing a construction that is adaptable for various sizes and shapes of fill nipples for different fuel tanks.

It should be recognized that the above list represents only some of the objects, features and advantages of the present invention, and that those skilled in the art will recognize other objects, features and advantages upon review of this disclosure in its entirety. Also, a fill nipple falling within the spirit and scope of the appended claims may achieve none, some or all of the listed advantages.

BRIEF DESCRIPTION OF THE DRAWINGS

These and other objects, features and advantages of this invention will be apparent from the following detailed description of the preferred embodiments and best mode, appended claims and accompanying drawings in which:

FIG. 1 is a perspective view of a fuel tank having a fill nipple of one presently preferred embodiment of the invention;

FIG. 2 is a cross-sectional view taken generally along line 2-2 of FIG. 1;

FIG. 3 is an enlarged view of the encircled area number 3 of FIG. 2;

FIG. 4 is an enlarged view of the encircled area number 4 of FIG. 2; and

FIG. 5 is a perspective view illustrating mold halves used to vacuum form a multi-layer parison to form a fill nipple.

DETAILED DESCRIPTION OF THE PREFERRED EMBODIMENTS

Referring in more detail to the drawings, FIG. 1 shows one presently preferred embodiment of a fuel tank 10 that has a shell 12 with an outer surface 14 and an inner surface 16 defining a cavity 18 for holding fuel. The shell 12 has a plurality of openings like opening 15 for receiving or providing access to components, for example and without limitation a fuel pump, pressure sensor, fuel level sensor, electrical connectors (all not shown), and an opening 20 for receiving fuel into the cavity 18. A fill nipple 22 is preferably attached to the outer surface 14 of the fuel tank 10 at a joint 25 and has a passage 24 aligned with the opening 20 so that fuel can pass through the passage 24 and into the cavity 18. The construction of the fill nipple 22 resists and preferably substantially prevents fuel vapor permeation therethrough to control and reduce evaporative emissions from the fuel tank 10. In addition, the joint 25 provides a secure attachment of the fill nipple 22 to the shell 12 and resists crack propagation or separation between the fill nipple 22 and the shell 12.

As shown in FIG. 3, the shell 12 of the fuel tank 10 has inner and outer layers of material 26, 28, respectively, separated by an intermediate layer of material 30. The intermediate layer 30 is preferably bonded to the inner and outer layers 26, 28 by a pair of adhesive layers 32 each disposed on an opposed side of the intermediate layer. The adhesive layers 32 provide a resilient bond between the intermediate layer 30 and the inner and outer layers 26, 28 to resist separation of the inner and outer layers 26, 28 from the intermediate layer 30. Preferably, the inner and outer layers 26, 28 are formed from a high-density polyethylene (HDPE), while the intermediate layer or barrier layer 30 is commonly formed from a material substantially impermeable to hydrocarbons, for example and without limitation, ethylene vinyl alcohol (EVOH). In the presently preferred embodiment, a layer of regrind material 33 is provided between the outer layer 28 and the adjacent adhesive layer 32.

As sown in FIG. 2, the fill nipple 22 has a body 34 with an outer surface 36 and an inner surface 38. The inner surface 38 defines the passage 24 extending between a pair of generally opposed ends 42, 44, with one end 44 constructed for attachment to the shell 12. Preferably, the end 44 includes in part a radially outwardly extending flange 46. The flange 46 presents at least a portion of the inner surface 38 for attachment to the shell 12.

As best shown in FIG. 4, the body 34 of the fill nipple 22 has an inner layer 48 of polymeric material and an outer layer 50 of polymeric material separated by an intermediate layer or barrier layer 52. Preferably, adhesive layers 54 bond the barrier layer 52 to both the inner and outer layers 48, 50. The inner and outer layers 48, 50 are preferably constructed from HDPE, while the intermediate layer 52 is preferably constructed from EVOH, and thus preferably has a similar laminate construction to that of the shell 12 of the fuel tank 10. The barrier layer 52 is substantially continuous throughout the body 34, and can be configured adjacent the ends 42, 44 to provide optimal sealing to limit the permeation of fuel vapors into the atmosphere. In the presently preferred embodiment, a layer of regrind material 55 is disposed between the outer layer 50 and adjacent adhesive layer 54.

The end 42 of the fill nipple 22 is preferably constructed to abut a fill pipe 56, and is commonly joined to the fill pipe 56 by a coupler, for example and without limitation, a low permeability rubber hose 58. Depending on the design requirements or necessities, the end 42 of the fill nipple 22 can have a variety of configurations. As such, it should be recognized that the orientation of the barrier layer 52 may take on differing configurations to best suit the individual design requirements. In the embodiment shown in FIG. 2, in addition to being configured to abut the fill pipe 56, the end 42 is configured to receive a snap-in inlet check valve assembly 60 that prevents fuel in the fuel tank 10 from escaping through the file nipple 22.

To form the fill nipple 22, a thermoform process is preferably used, and could be vacuum, blow or compression or hot forming molded, using the multi-layer wall construction preferably of HDPE, EVOH, adhesive and regrind layers discussed above. Forming the fill nipple 22 in this manner provides adhesion of the HDPE inner and outer layers 48, 50 to the EVOH barrier layer 52 through the adhesive layers 54. Therefore, the potential for permeation of fuel or fuel vapors through the multi-layer wall is greatly reduced.

In one forming process, an extruded multi-layer preform which may be any suitable shape including a generally flat sheet, preferably comprising the six layers of material previously discussed, is placed between two mold halves. With the parison placed between the two molds, the molds come together and form the parison to form the fill nipple 22. Upon bringing the two molds together, a parting line is formed, with the parting line preferably designed to expose the barrier layer 52 for trimming at specified locations at the ends 42, 44. It should be recognized that the fill nipple 22 can be trimmed while in the mold.

An alternate manufacturing process can be used that utilizes a vacuum to form the fill nipple 22. As shown in FIG. 5, a multi-layer sheet 70, preferably including the six-layers of material previously discussed, is formed between a male plug mold half 72 and a female mold half 74. The male mold half 72 includes a plug 76 that extends outwardly from a base 78 of the mold half 72 and is generally cylindrical in shape to form a generally cylindrical wall of the fill nipple 22. Preferably, an annular wall 80 extends from the base 78 surrounding and spaced from the plug 76. The annular wall 80 and the space between the annular wall 80 and the plug 76 facilitate taking up some of the sheet material as the sheet 70 is formed over the plug 76 to reduce or eliminate the formation of creases or wrinkles as the sheet 70 is formed over the plug 76.

The female mold half 74 is complementary shaped to the male mold half 72. The female mold half 74 includes a generally cylindrical cavity 82 adapted to receive the male plug 76 with a sheet 70 of material between them, and an annular cavity 84 which surrounds and is spaced from the cylindrical cavity 82 and is adapted to receive the wall 80 with the sheet 70 of material between them.

To form a fill nipple 22, a heated multi-layer sheet 70 is preformed on the male mold half 72 over the plug 76 by imparting a preforming vacuum between the sheet 70 and the male mold half 72. Thereafter, the female mold half 74 is disposed over the preformed sheet 70 and male mold half 72. When the female mold half 74 is fully received on the sheet 70 and male mold half 72, the preforming vacuum is turned off, and a finish vacuum is imparted between the female mold half 74 and the preformed sheet 70. For ease of forming, the temperature of the sheet 70 is preferably maintained between about 210° C.-230° C. Preferably, upon forming the fill nipple 22, a suitable minimum wall thickness of, for example, about 2-4 mm is maintained so that the fill nipple 22 has adequate strength to resist fracture in use. The fill nipple 22 is then trimmed from the formed sheet 70, and any scrap material is preferably saved for use in a regrind layer of a subsequent sheet 70, fuel tank or other fuel system component.

After forming the fill nipple 22, the fill nipple 22 can be attached to the outer surface 14 of the fuel tank 10. Preferably, hot plates are used to weld or sand the inner layer 48 of the flange 46 to the outer surface 14 of the shell 12. Generally, both the inner surface 38 of the fill nipple 22 and the outer surface 14 of the shell 12 are heated to about 200° C.-250° C. Upon heating the surfaces, the fill nipple 22, while having the passage 24 aligned with the opening 20 in the fuel tank 10, is pressed against the shell 12 of the fuel tank 10 to attach or bond the fill nipple 22 to the outer surface 14 of the shell 12. The heat applied to the outer surface 14 of the shell 12 and the inner surface 38 of the fill nipple 22 typically creates a melt zone extending into the outer surface 14 and inner surface 38 to a depth of about 1 to 1.5 mm.

With the fill nipple 22 attached to the shell 12, the check valve 60 and the fill pipe 56 are preferably assembled to the fill nipple 22. The coupler 58 preferably attaches the fill pipe 56 adjacent the end 42 of the fill nipple 22, and preferably a pair of hose clamps 62 are positioned to secure the coupler 58 to both the fill nipple 22 and the fill pipe 56, as is commonly known.

It should be recognized that the fuel tank 10 and fill nipple 22 may be constructed from different materials or compositions of materials, for example and without limitation, as shown in FIG. 2, the outer layer may include carbon black to facilitate welding a cover 66 to the outer surface 36 of the flange portion 46 and to the fuel tank 10. The carbon black facilitates the use of a through-transmission infrared (TTIR) welding process to join the cover 66 to the outer surface 36 of the fill nipple 22 and surface 28 of the fuel tank 10. The cover 66 can further prevent fuel vapor from entering the atmosphere. The cover 66 is preferably formed with a similar multi-layer construction including a vapor barrier layer. The cover 66 preferably overlies the weld zone between the fill nipple 22 and the fuel tank 10.

Many modifications and variations of the present invention will be apparent to those of ordinary skill in the art. It is, therefore, to be understood that within the scope of the appended claims, the invention may be practiced otherwise than as specifically described. The invention is defined by the claims that follow.

We claim:

1. A fuel tank, comprising:
a shell defining an interior for holding fuel and having an opening for receiving fuel into the interior of the shell, the shell having at least an outer layer of a polymeric material and a vapor barrier layer of a polymeric material different than the polymeric material of the outer layer;
a separate one-piece fuel fill nipple having an outer surface and an inner surface defining a passage extending between a pair of generally opposed open ends of the fill nipple with one open end attached to the shell with the passage aligned with the opening in the shell for allowing fuel to flow though the passage and into the shell, the fill nipple has an inner layer of a polymeric material forming the inner surface of the fill nipple, an outer layer of polymeric material forming the outer surface of the fill nipple, a vapor barrier layer of a polymeric material different than the polymeric material of the inner and outer layers and disposed between and adhered to the inner and outer layers, and a pair of adhesive layers with one adhesive layer disposed between the outer layer and the vapor barrier layer and the other adhesive layer disposed between the inner layer and the vapor barrier layer, the vapor barrier layer being separate and spaced from the vapor barrier layer of the shell;
at least the outer layer of the shell and the inner layer of the fill nipple welded together circumferentially continuously around the opening; and
a separate cover with an inner layer of a polymeric material welded to the outer layer of the shell and circumferentially continuously around the fill nipple and welded to the outer layer of the fill nipple circumferentially continuously around the fill nipple and spanning the area of attachment of the fill nipple to the shell and with a vapor barrier layer of a polymeric material different than the polymeric material of the inner layer of the cover and adhered to the inner layer of the cover.

2. The fuel tank of claim 1 wherein the cover includes an EVOH polymeric vapor barrier layer.

3. The fuel tank of claim 1 wherein said one end is defined in part by a radially outwardly extending flange that presents at least a portion of the inner surface for attachment to the shell and the cover is attached to said flange.

4. The fuel tank of claim 3 wherein a plastic weld joint attaches the flange to the shell and the cover overlies the weld joint.

5. The fuel tank of claim 1 wherein the shell includes an outer layer and an inner layer, and the inner layer of the fill nipple is attached to the outer layer of the shell and the cover is attached to the outer layer of the fill nipple and the outer layer of the shell.

6. A fuel tank, comprising:
a shell of a first polymeric material and defining an interior for holding fuel and having an opening for receiving fuel into the interior and a vapor barrier layer of a second polymeric material different than the first polymeric material and adhered to the first polymeric material;
a separate one-piece fuel fill nipple having an outer surface and an inner surface defining a passage extending between a pair of generally opposed open ends of the fill nipple with one open end at least partially overlapped with and attached to the shell with the passage aligned with the opening through the shell for allowing fuel to flow though the passage and into the shell, the fill nipple has an inner layer of a polymeric material forming the inner surface of the fill nipple, an outer layer of polymeric material forming the outer surface of the fill nipple, and a vapor barrier layer between the inner and outer layers of a polymeric material different than the polymeric material of the inner and outer layers of the fill nipple, adhered to the inner and outer layers of the fill nipple and separate from the vapor barrier layer of the shell, wherein the separate vapor barrier layer of the fill nipple overlies the shell vapor barrier layer along the entire extent of the overlap of the fill nipple and shell providing at least two vapor barrier layers along the entire extent of the overlap of the fill nipple and shell and at least a portion of the two overlapping vapor barrier layers being spaced apart circumferentially continuously around the opening of the shell; and
the first polymeric material of the shell and an adjacent layer of the fill nipple are of the same polymeric material and are welded together circumferentially continuously around the opening of the shell.

7. The fuel tank of claim 6 wherein the end of the fill nipple not attached to the shell is constructed and arranged to carry at least a portion of two separate fuel system components.

8. The fuel tank of claim 6 wherein said one end includes a radially inwardly extending flange and said another end includes a radially outwardly extending flange.

9. A fuel tank, comprising:
a shell defining an interior for holding fuel and having an opening for receiving fuel into the interior, the shell including a vapor barrier layer;
a separate one-piece fuel fill nipple having an outer surface and an inner surface defining a passage extending between a pair of generally opposed open ends of the fill nipple with one end circumferentially continuously attached to the shell with the passage aligned with the opening for allowing fuel to flow though the passage and into the interior of the shell, the fill nipple has an inner layer of material forming the inner surface of the fill nipple, an outer layer of material forming the outer surface of the fill nipple, a vapor barrier layer of a polymeric material between the inner and outer layers and different than the polymeric material of the inner and outer layers, and a pair of adhesive layers with one adhesive layer disposed between the outer layer and the vapor barrier layer and the other adhesive layer disposed between the inner layer and the vapor barrier layer, the vapor barrier layer of the fill nipple being separate and spaced from the vapor barrier layer of the shell circumferentially continuously around the opening of the shell; and
a separate cover having polymeric inner and outer layers and a polymeric vapor barrier layer between and adhered to its inner and outer layers and of a polymer different than the polymer of its inner and outer layers, the separate cover being connected to the shell and the fill nipple and spanning the area of attachment of the fill nipple to the shell and being welded to the fill nipple circumferentially continuously around the fill nipple and welded to the shell circumferentially continuously around the fill nipple and the opening through the shell.

10. A fuel tank, comprising:
a shell of a first polymeric material and defining an interior for holding fuel and having an opening for receiving fuel into the interior and a vapor barrier layer of a second polymeric material different than the first polymeric material and adhered to the first polymeric material;

a separate one-piece fuel fill nipple having an outer surface and an inner surface defining a passage extending between a pair of generally opposed open ends of the fill nipple with one end at least partially overlapped with and attached to the shell with the passage aligned with the opening allowing fuel to flow though the passage and into the interior of the shell, the fill nipple has an inner layer of polymeric material forming the inner surface of the fill nipple, an outer layer of polymeric material forming the outer surface of the fill nipple, and a vapor barrier layer of a polymeric material between and adhered to the inner and outer layers and separate from the shell vapor barrier layer, wherein the fill nipple vapor barrier layer overlies the shell vapor barrier layer along the entire extent of the overlap of the fill nipple and shell providing two vapor barrier layers along the entire extent of the overlap of the fill nipple and shell with at least a portion of the overlapped two vapor barrier layers being spaced apart circumferentially continuously around the opening of the shell; and the first polymeric material of the shell and the inner layer of polymeric material of the fill nipple are of the same polymeric material and are welded together circumferentially continuously around the opening of the shell.

\* \* \* \* \*